US008170551B2

(12) United States Patent  (10) Patent No.: US 8,170,551 B2
Rahman et al.  (45) Date of Patent: May 1, 2012

(54) PLUS CODE DIALING IN A MOBILE DEVICE

(75) Inventors: Iftekhar Rahman, Billerica, MA (US);
Gordana Guranovic, Piscataway, NJ (US); Eric Wu, Denville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 483 days.

(21) Appl. No.: 12/410,361

(22) Filed: Mar. 24, 2009

(65) Prior Publication Data

US 2010/0248711 A1  Sep. 30, 2010

(51) Int. Cl.
*H04W 4/00* (2009.01)
*H04M 3/00* (2006.01)
(52) U.S. Cl. ............ 455/432.3; 455/434; 379/355.08
(58) Field of Classification Search ......... 455/432.3
See application file for complete search history.

(56) References Cited

U.S. PATENT DOCUMENTS

| | | | |
|---|---|---|---|
| 2006/0177043 A1* | 8/2006 | Li et al. ............... | 379/355.08 |
| 2007/0041347 A1* | 2/2007 | Beale et al. ............ | 370/335 |
| 2007/0087754 A1* | 4/2007 | Yacobi et al. ........... | 455/445 |
| 2010/0099406 A1* | 4/2010 | Anantharaman et al. ... | 455/434 |

* cited by examiner

*Primary Examiner* — Lester Kincaid
*Assistant Examiner* — Andy Gu

(57) ABSTRACT

A mobile device include processes that allow the mobile device to make international calls using network-based plus code dialing even when the current network does not inherently support network-based plus code dialing. The mobile device obtains, via a set-up process, state information describing whether the network supports network-based plus code dialing. The mobile device transmits, in response to a request from a user and when the state information indicates the network supports network-based plus code dialing, a message to the network to initiate the international call based on a network-based plus code dialing scheme. The mobile device transmits, in response to the request from the user and when the state information indicates the network does not support network-based plus code dialing, a message to the network to initiate the international call using a handset-based plus code dialing scheme.

20 Claims, 10 Drawing Sheets

| MCC | SID RANGE | SID CONFLICT (TRUE/FALSE) | NB-PCD SUPPORTED (TRUE/FALSE) | NB-PCD LAST ATTEMPTED (MO-YEAR) | IDD |
|---|---|---|---|---|---|
| 410 | 420 | 430 | 440 | 450 | 460 |
| 310 | 40000 | FALSE | FALSE | 06-2007 | 011 |

DIALING LOOK-UP TABLE (DLUT) 400

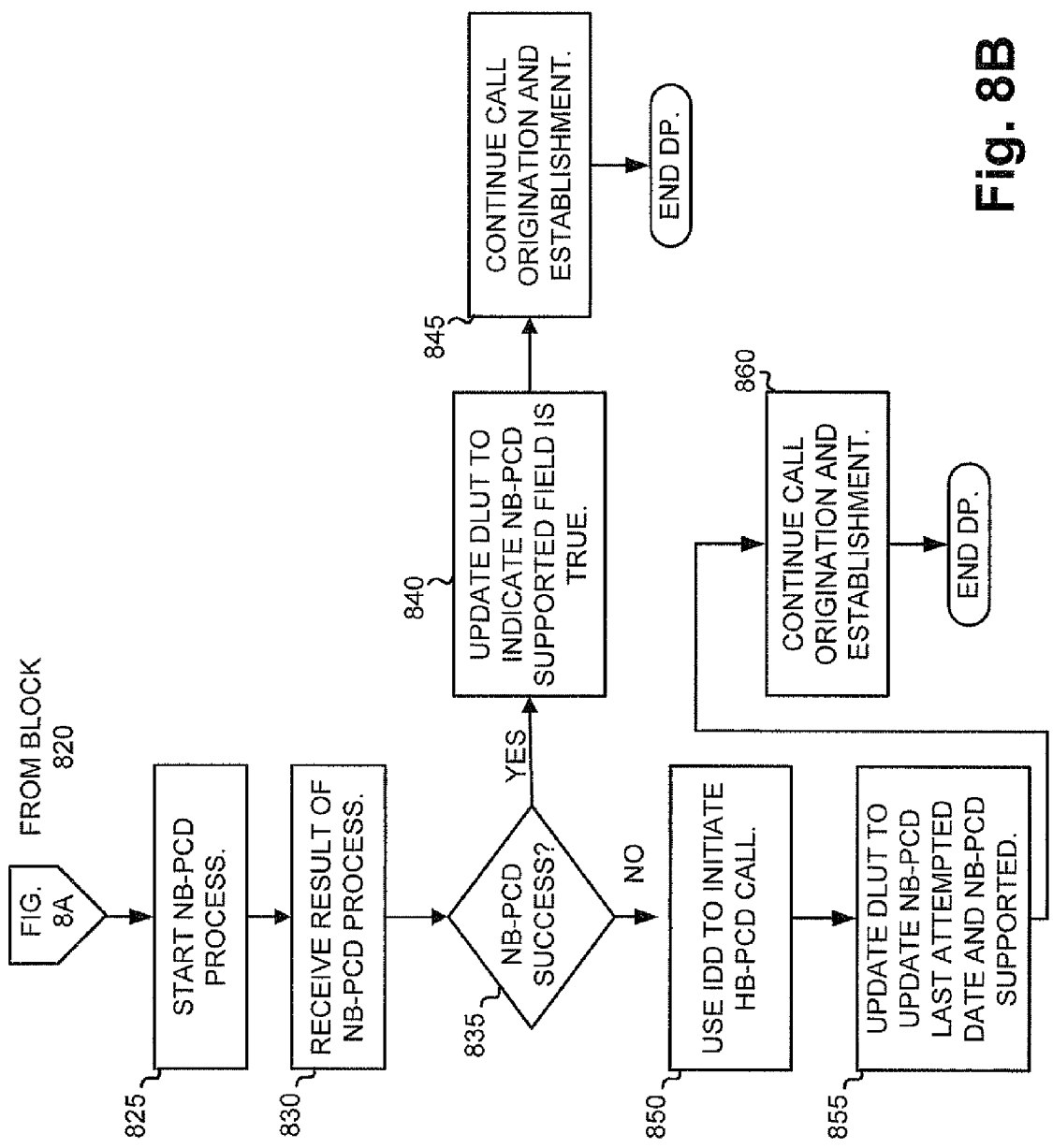

PLUS CODE DIALING IN A MOBILE DEVICE

BACKGROUND INFORMATION

Some mobile telephone services require the user, when making an international call, to enter an International Direct Dial (IDD) prefix of the user's country, a country code corresponding to the country the user intends to dial, and a national number corresponding to the device of the called party. The IDD prefix represents an access code that callers use to dial out of a country. Different countries may have different IDD prefixes.

Other mobile telephone services allow "+" (plus) code international dialing, in which, instead of the user entering the IDD prefix, the user may simply dial a "+" followed by the destination country code and national number. When the "+" is used, the mobile device recognizes that the user wants to make an international call. The device will then send the destination country code and the national number in an appropriate call SETUP message to the network. The SETUP message may contain all the information that the network needs to complete the call. Networks designed to handle plus code dialing can include GSM (Global System for Mobile communications) and UMTS (Universal Mobile Telecommunication System) networks.

Other wireless networks, such as CDMA2000 networks, are not designed to handle plus code dialing. In these networks, even if the mobile device recognizes that a "+"entered by the user is an indication that the user wishes to make an international call, the network expects that the IDD prefix be explicitly pre-pended to the country code and the national number. This means that the user needs to know the IDD prefix for the country from which the user is dialing. Requiring the user to know the IDD of the current country in which the user is located can be an inconvenience for the user.

BRIEF DESCRIPTION OF THE DRAWINGS

FIG. 4 is a diagram illustrating an exemplary dialing look-up table (DLUT) that includes information that may be stored by a mobile device;

FIGS. 8A and 8B are a flow chart illustrating exemplary operations for performing a dialing process.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein enable mobile devices to make international calls using plus code dialing even when the current network does not inherently support plus code dialing. Consequently, a mobile user may use plus code dialing to place international calls irrespective of the type of network being used by the mobile device.

Figure 1:
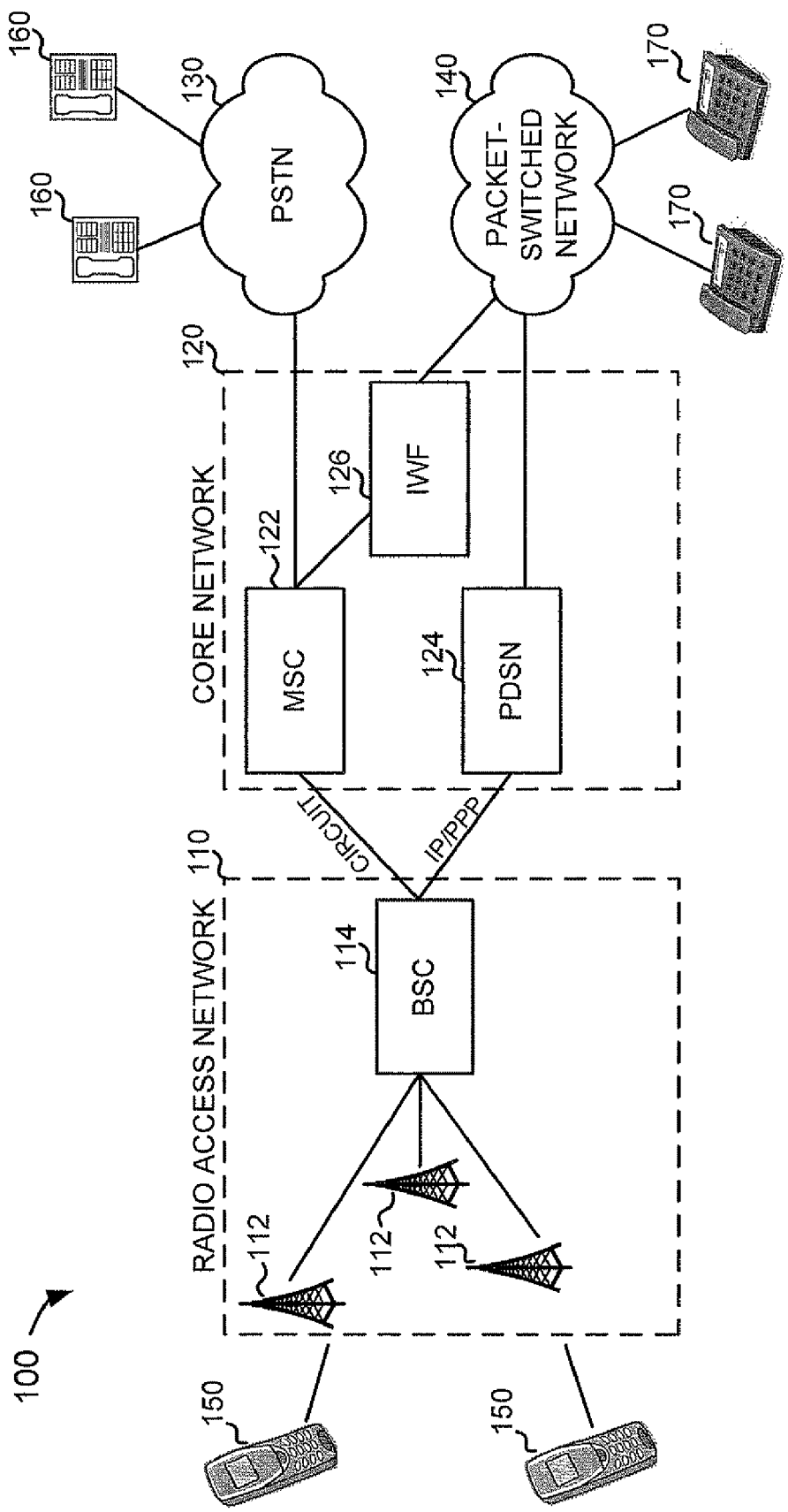
FIG. 1 is a diagram of an exemplary telecommunication system in which systems and/or methods described herein may be implemented.

FIG. 1 is a diagram of an exemplary telecommunication system 100 in which systems and/or methods described herein may be implemented. In this example, telecommunication system 100 is particularly shown as a CDMA2000 network, although mobile devices using concepts described herein may also be used with other types of networks (e.g., GSM or UMTS). As illustrated, system 100 may include a radio access network 110 and a core network 120. Communication devices, such as mobile telephones 150 may connect to one or more of radio access network 110 to obtain telecommunications services from this network. Mobile telephones 150 will also be referred to as mobile devices 150 herein.

Radio access network 110 may generally include components to enable wireless access to system 100 by mobile devices 150. Radio access network 110 may include a plurality of base transceiver stations (BTSs) 112 and one or more base station controllers (BSCs) 114. In general, multiple BTSs 112 may connect to core network 120 through each BSC 114.

Each BTS 112 may include components that enable the reception and transmission of wireless signals with mobile devices 150. For instance, a BTS 112 may include, among other devices, an antenna and a radio transceiver for transmission and reception of wireless signals.

BSC 114 may include components for connecting BTS 112 to core network 120. BSC 114 may, for example, handle transcoding of speech signals, allocation of radio channels to mobile devices, quality management of transmission and reception of the radio interface, and other tasks related to radio communications. BSC 114 may connect to core network 120 via, for example, an end-to-end circuit-based connection when communicating with devices connected to PSTN 130 and an Internet Protocol (IP)/Point-to-Point(PPP) connection when communicating with devices connected to packet-switched network 140.

Core network 120 may include a mobile switching center (MSC) 122, a packet data serving node (PDSN) 124, and an interworking function (IWF) component 126.

MSC 122 may perform a number of functions relating to managing communications between mobile devices 150 and devices connected to PSTN 130 and between two mobile devices 150. For instance, MSC 122 may act to set-up and release end-to-end connections, handle mobility and handover requirements during a telephone call, and take care of charging and real-time pre-paid account monitoring. MSC 122 may also control other communications services implemented in system 100, such as conference calls and FAX related services.

PDSN 124 may act as a connection point between radio access network 110 and packet-switched network 140. PDSN 124 may generally be responsible for managing point-to-point protocol (PPP) sessions between core network 120 and mobile device 150.

IWF 126 may provide an interface between MSC 122 and packet-switched network 140. IWF 126 may allow mobile devices 150 the ability to receive packet data even when connecting through MSC 122.

It can be appreciated that radio access network 110 and core network 120 can include different or additional components than those shown in FIG. 1. Further, although particularly shown as a CDMA2000 system in FIG. 1, other network technologies, such as GSM or UMTS may be implemented. In implementations in which system 100 includes support for network-based plus code dialing, the network-based plus code dialing may be handled by one or more of the components in radio access network 110 and/or core network 120. For example, MSC 122 may recognize plus code dialing requests, reconstitute the appropriate IDD for the user, and route the call to its final destination.

PSTN 130 may represent the public switched telephone network in which connections in PSTN 130 may be allocated on a per-channel basis. For example, a telephone call carried over PSTN 130 may be implemented as digitized audio that is transmitted over PSTN 130 over a channel set-up for the telephone call.

Packet-switched network 140 may include one or more networks, potentially including the Internet, in which data is transmitted in discreet units, such as packets. The packets may be routed over network 140 using one or more routing protocols.

Mobile devices 150 may include portable devices capable of connecting with radio access network 110. For example, mobile devices 150 may include cellular phones, computers with wireless connectivity, WiFi devices, or WiMax devices. Telephones 160 may include traditional analog telephones designed to communicate over PSTN 130. IP telephones 170 may include communication devices designed to communicate based on the voice over IP (VoIP) protocol.

Figure 2:
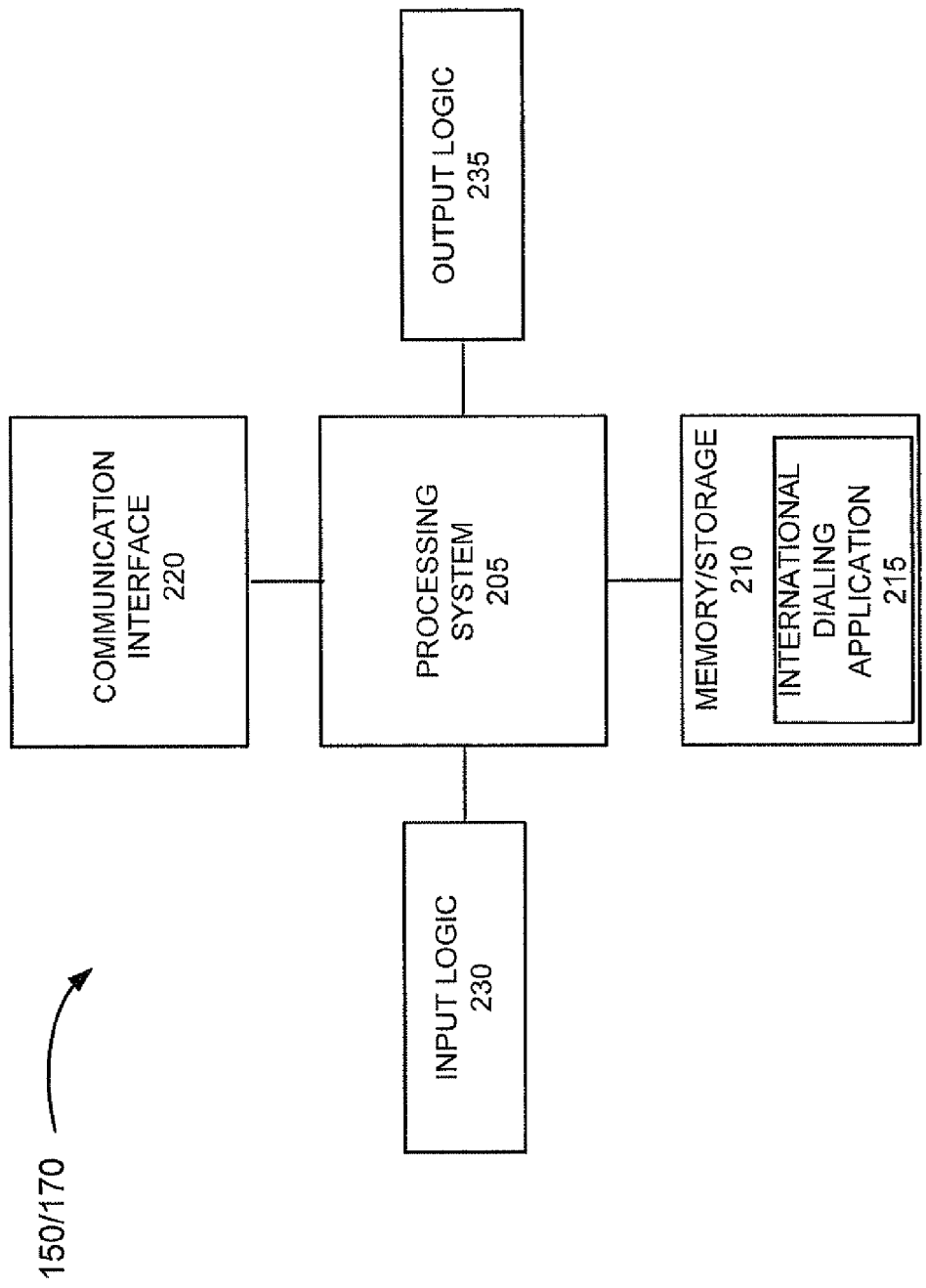
FIG. 2 is a diagram illustrating exemplary components of a user device.

FIG. 2 is a diagram illustrating exemplary components of a user device, such as one of mobile devices 150 or IP telephones 170. As illustrated, device 150/170 may include a processing system 205, a memory/storage 210, a communication interface 220, input logic 230, and output logic 235. In other embodiments, device 150/170 may include fewer, additional, and/or different components, or a different arrangement of components than those illustrated in FIG. 2 and described herein.

Processing system 205 may include one or more processors, microprocessors, data processors, co-processors, network processors, application specific integrated circuits (ASICs), controllers, programmable logic devices, chipsets, field programmable gate arrays (FPGAs), or some other component that may interpret and/or execute instructions and/or data. Processing system 205 may control the overall use of device 150/170 based on an operating system and/or various applications. Processing system 205 may interpret and/or execute instructions and/or data.

Memory/storage 210 may include computer-readable memory and/or secondary storage. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, etc.) or some other type of computer-readable medium, along with a corresponding drive.

Memory/storage 210 may store data, application(s), and/or instructions related to the operation of device 150/170. In one particular implementation, memory/storage 210 may include both DRAM memory that may be used to store programming instructions while they are executed by processing system 205 and non-volatile memory (NVM), such as flash memory, that stores data structures that can be retained by device 150/170 even after it is powered-off.

Communication interface 220 may permit device 150/170 to communicate with other devices, networks, and/or systems. For example, communication interface 220 may include a radio interface for communicating with a cellular network, such as one implemented by radio access network 110. In some implementations, communication interface 220 may additionally include an Ethernet interface, a microwave interface, or some other type of wireless or wired interface.

Input logic 230 may permit a user and/or another component to input information to device 150/170. For example, input logic 230 may include a keypad, a touchpad, a microphone, an input port, voice recognition logic, and/or some other type of visual, auditory, etc., input logic. Output logic 235 may permit device 150/170 to output information to a user and/or another component. For example, output logic 235 may include a display, speakers, one or more light emitting diodes (LEDs), an output port, a vibrator, and/or some other type of visual, auditory, tactile, etc., output logic.

Device 150/170 may particularly execute international dialing application 215. International dialing application 215 may, in general, determine when the network to which device 150/170 is currently connected supports plus code dialing. If so, during dialing of an international number, device 150/170 may use the plus code dialing services of the network. If not, during international dialing, device 150/170 may explicitly pre-pend the appropriate IDD to the dialed number. Operations performed by international dialing application 215 will be described in more detail below.

Figure 3:
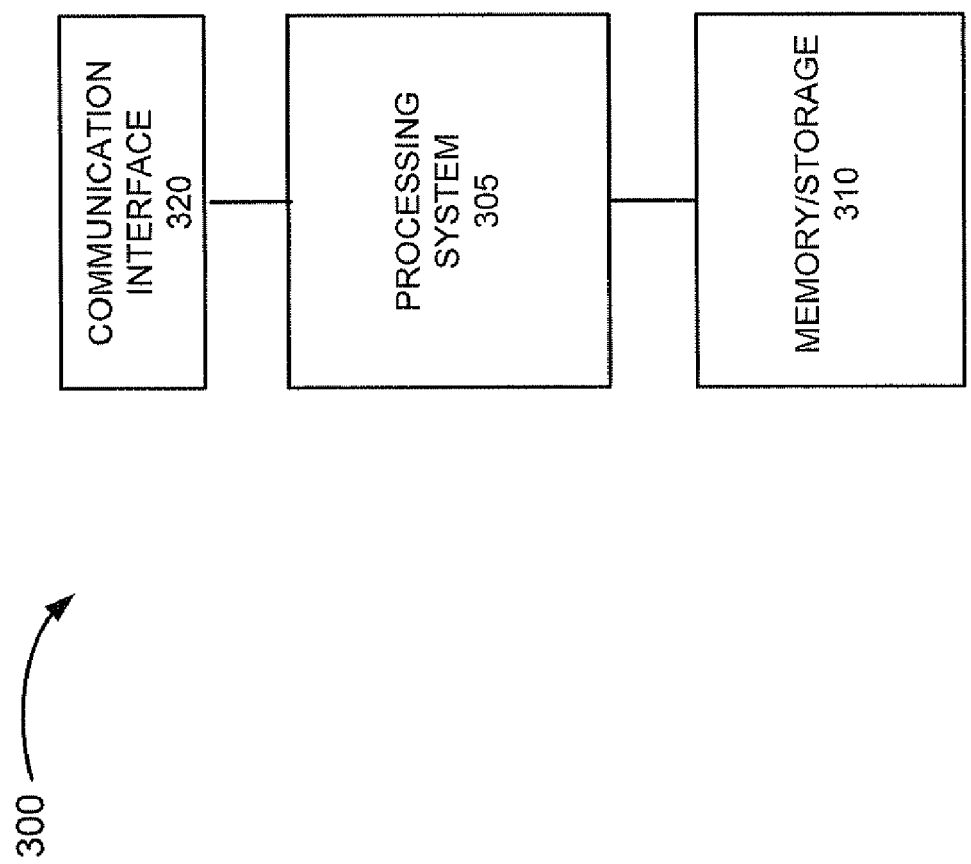
FIG. 3 is a diagram illustrating exemplary components of a network device shown in FIG. 1.

FIG. 3 is a diagram illustrating exemplary components of a network device 300, such as one of the network devices shown in FIG. 1, including BSC 114, MSC 122, PDSN 124, and/or IWF 126. As illustrated, network device 300 may include a processing system 305, a memory/storage 310, and a communication interface 320. In other embodiments, network device 300 may include fewer, additional, and/or different components, or a different arrangement of components than those illustrated in FIG. 3 and described herein.

Processing system 305 may include one or more processors, microprocessors, data processors, co-processors, network processors, application specific integrated circuits (ASICs), controllers, programmable logic devices, chipsets, field programmable gate arrays (FPGAs), or some other component that may interpret and/or execute instructions and/or data. Processing system 305 may control the overall operation of network device 300 based on an operating system and/or various applications. Processing system 305 may interpret and/or execute instructions and/or data.

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, etc.) or some other type of computer-readable medium, along with a corresponding drive.

Communication interface 320 may permit network device 300 to communicate with other devices, networks, and/or systems. For example, communication interface 320 may include an Ethernet interface, a radio interface, a microwave interface, or some other type of wireless or wired interface.

As previously mentioned, a device such as mobile device 150 may execute international dialing application 215 to support plus code dialing regardless of whether the network to which the device is currently connected supports plus code dialing from within the network. Data structures that may be used by international dialing application 215 will next be described with reference to FIGS. 4 and 5.

FIG. 4 is a diagram illustrating an exemplary dialing look-up table (DLUT) 400 that includes information that may be stored by mobile device 150. DLUT 400 may be a data structure that is used by international dialing application 215.

DLUT 400 may be stored in a non-volatile memory portion of memory/storage 210, such as in a flash drive or a hard disk drive.

DLUT 400 may generally store information that mobile device 150 uses in determining how to implement an international call. As particularly shown in FIG. 4, each entry of DLUT 400 may include a mobile country code (MCC) field 410, a system identifier (SID) range field 420, SID conflict field 430, network-based plus code dialing (NB-PCD) supported field 440, NB-PCD last attempted field 450, and IDD field 460.

MCC field 410 may include entries that define mobile country codes (MCCs). In general, MCCs are known codes used for identifying wireless telephone networks. The MCC may be part of the International Mobile Subscriber Identity (IMSI) number, which uniquely identifies a particular subscriber, and is stored on a (usually) removable SIM card in the mobile device. Different countries may be associated with different MCCs or different MCC ranges. For example, the United States is associated with MCCs 310-316 and the United Kingdom is associated with the MCCs 234 and 235.

SID range field 420 may include entries that define a system ID (SID) range for a particular MCC. SIDs are used to identify individual networks within a country. Different carriers, for instance, may be assigned different SIDs for their networks. SIDs are normally assigned to countries by the international organization IFAST, and individual codes may be nationally assigned to carriers within a country.

SID conflict field 430 may be used to indicate whether a SID is being used by two different carriers or systems (a "SID conflict"). Although SID codes should normally be unique, conflicts can occur when a carrier is using an incorrect code to identify its network or the when a SID is incorrectly assigned to a carrier. SID conflict field 430 may store the value TRUE to indicate a SID conflict and FALSE otherwise.

NB-PCD supported field 440 may store an indication of whether the network identified in SID range field 420 supports network-based plus code dialing. NB-PCD supported field 440 may store the value TRUE to indicate the network supports network-based plus code dialing and the value FALSE otherwise. As previously mentioned, networks that support network-based plus code dialing may, at the network level, support calls which were indicated as international calls without an explicit IDD prefix.

NB-PCD last attempted field 450 may store the date of the last time the mobile device attempted to use network-based plus code dialing with the indicated network. International dialing application 215 may use this field to determine when to re-test a particular network to see if it currently supports plus code dialing.

IDD field 460 may be used to store the IDD associated with the entry in DLUT 400.

One particular exemplary entry, entry 470, is shown in FIG. 4 for DLUT 400. As shown, MCC field 410 includes the value 310, SID range field 420 includes the value 40000, SID conflict field 430 includes the value FALSE, NB-PCD supported field 440 includes the value FALSE, NB-PCD last attempted field 450 includes the value 06-2007 (i.e., June 2007), and IDD field 460 includes the value 011.

In one implementation, DLUT 400 may be initially configured at manufacture or setup to include entries relating to known networks. Alternatively or additionally, entries may be dynamically added to DLUT 400 during operation of mobile device 400. Further, as will be described in more detail below, entries in DLUT 400 may also be updated by mobile device 150 during operation of international dialing application 215.

Figure 5:
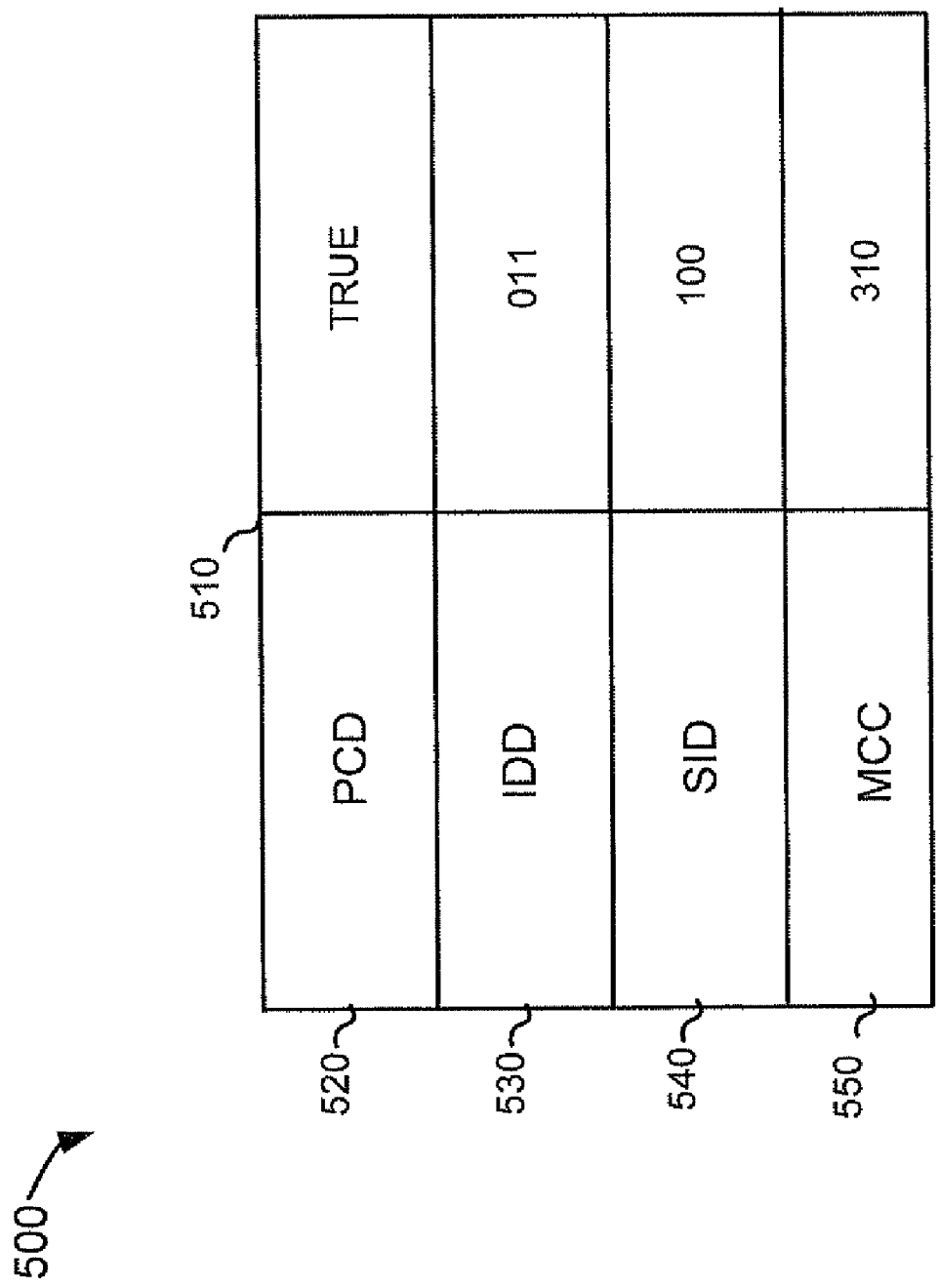
FIG. 5 is a diagram illustrating exemplary state information that may be stored by mobile device during operation.

FIG. 5 is a diagram illustrating exemplary state information 500 that may be stored by mobile device 150 during operation. State information 500 may be used by international dialing application 215. State information 500 may be maintained, for example, in memory/storage 210 of mobile device 150. State information 500 may be stored in a data structure 510, and may include PCD value 520, IDD value 530, SID value 540 and MCC value 550. PCD value 520 may store whether, during a dialing operation, mobile device 150 should use network-based plus code dialing. IDD value 530 may store the current IDD prefix associated with the mobile device. SID value 540 may store the current system ID of the network to which the mobile device 150 is connected. MCC value may store the mobile country code of the network to which the mobile device 150 is currently connected. Exemplary values for state information 500 in FIG. 5 include "TRUE" for PCD value 520, "011" for IDD value 530, "100" for SID value 540 and "310" for MCC value 550.

Figure 6:
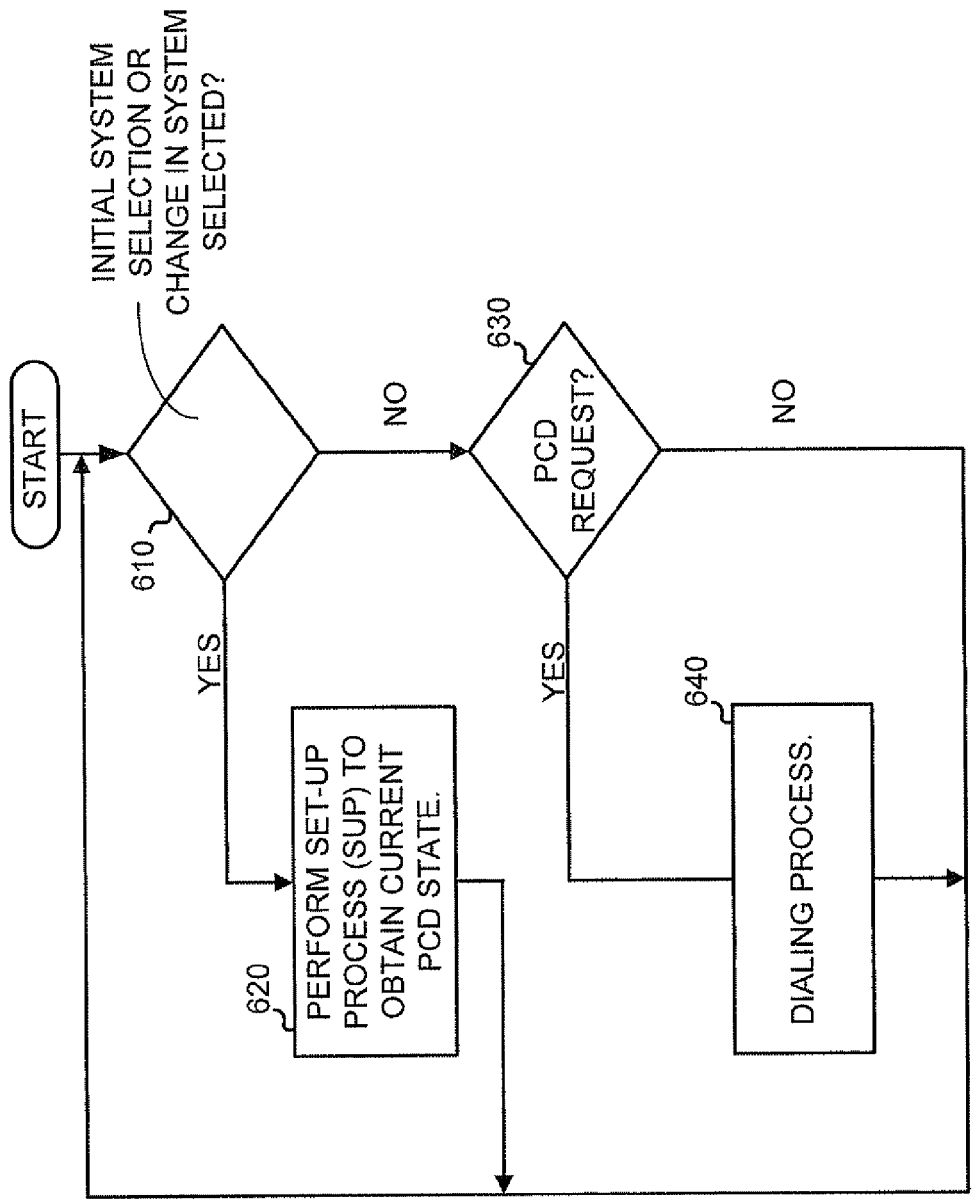
FIG. 6 is a flow chart illustrating exemplary operations for performing plus code dialing by a mobile device.

FIG. 6 is a flow chart illustrating exemplary operations for performing plus code dialing by a mobile device 150. Mobile device 150 may occasionally perform a network (system) selection process to connect to a wireless network within range. For instance, system selection may be performed by mobile device 150 when the mobile device is initially turned on by the user. System selection may also be performed at other times by mobile device 150. For instance, mobile device 150 may periodically search for a preferred system or may perform a new system selection operation in response to a change in reception quality of the current system.

Figure 7A:
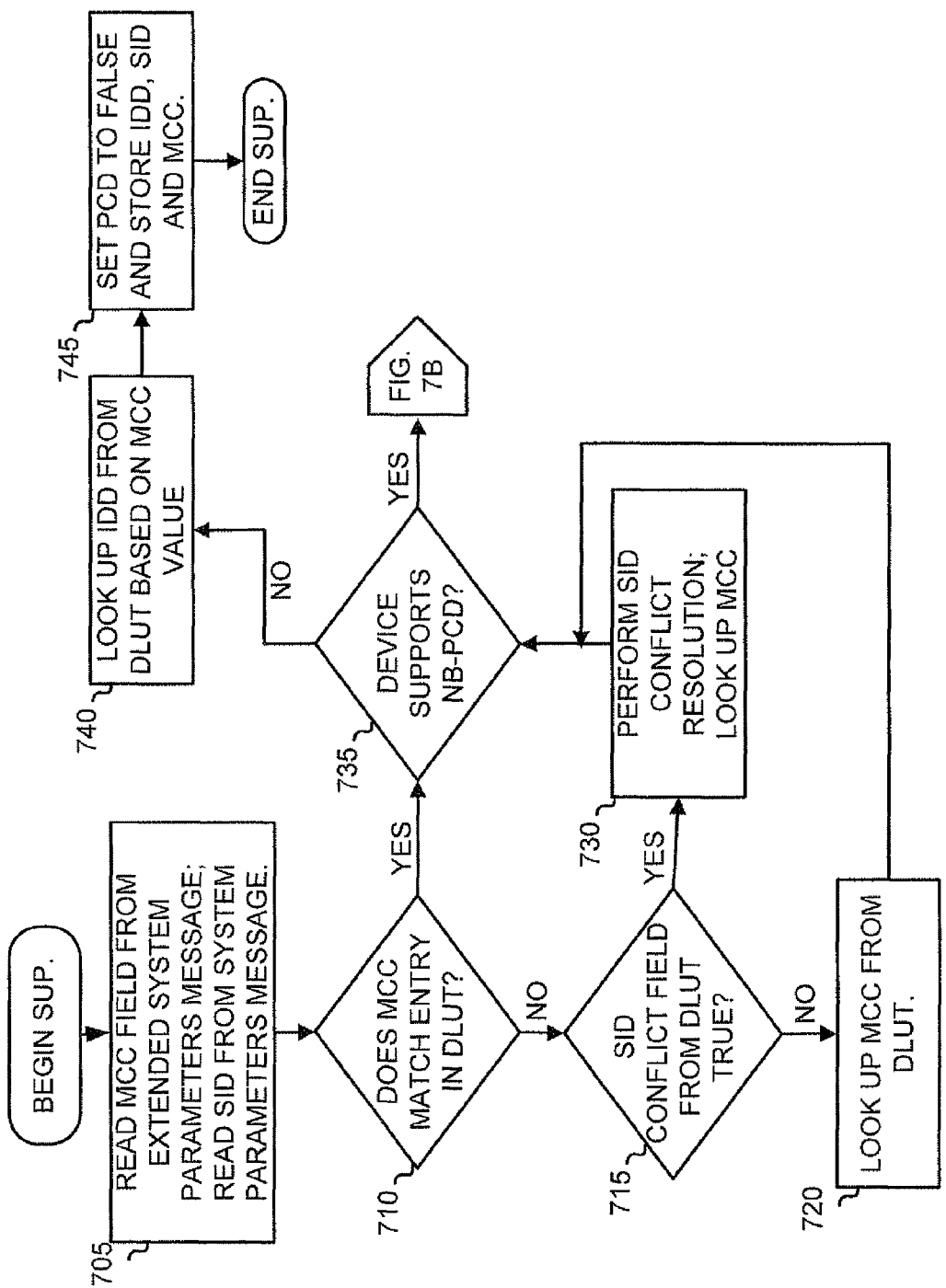
FIGS. 7A and 7B are a flow chart illustrating exemplary operations for performing a set-up process.
Figure 7B:
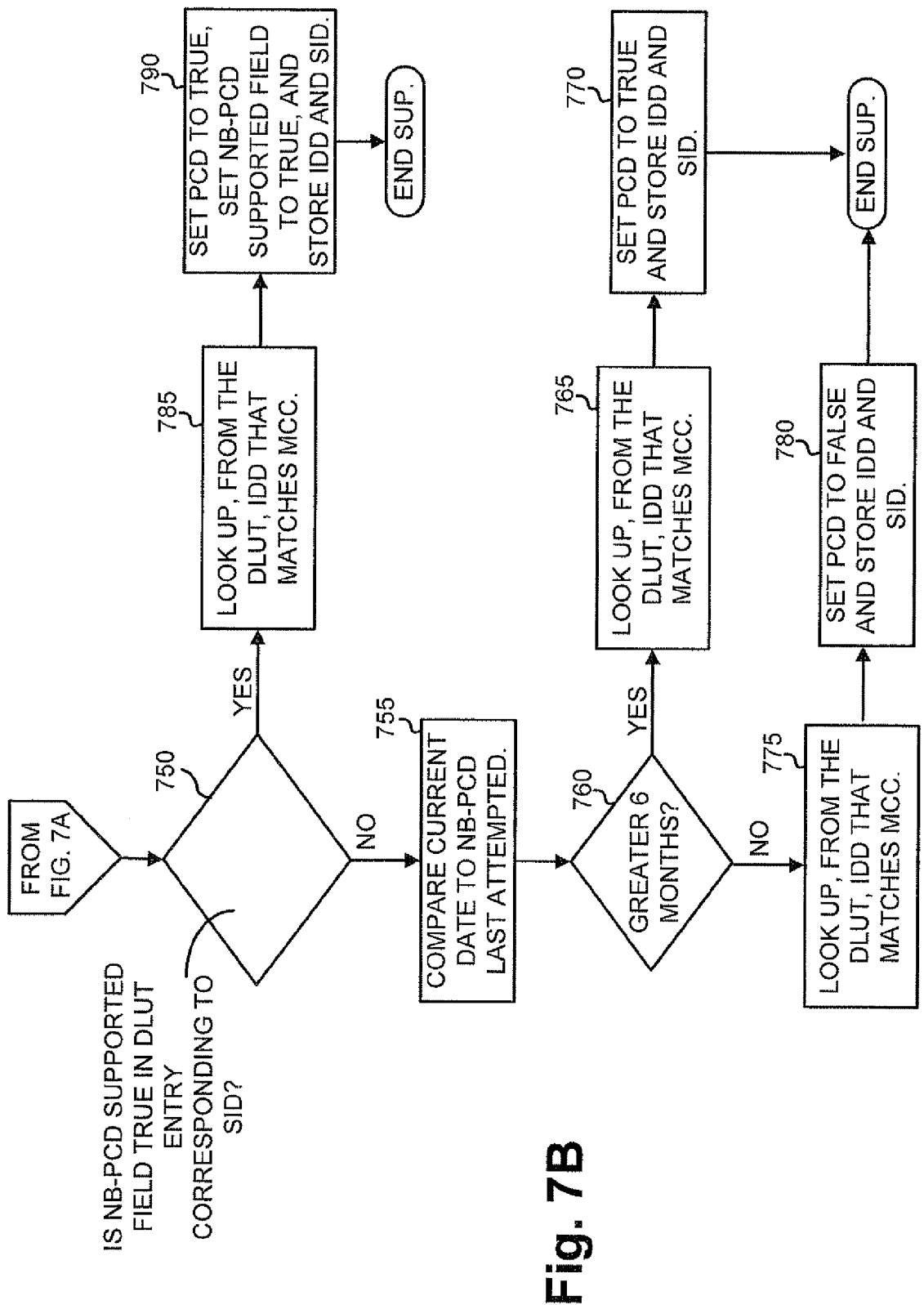

When a system selection operation is performed by mobile device 150, (block 610—YES), mobile device 150 may perform a set-up process (SUP) to obtain information relating to the state of plus code dialing with the current network (block 620). The obtained information may generally describe how mobile device 150 will handle plus code dialing requests that are entered by the user. FIGS. 7A and 7B, described below, provides details of an exemplary set-up process.

At some point, the user may initiate a plus code dialing request (block 630). In response (block 630—YES), mobile device 150 may perform a dialing process to initiate the call (block 640). The call may be performed using a dialing process based on the state information 500 (FIG. 5) for the current network.

FIGS. 7A and 7B are a flow chart illustrating operations for performing the set-up process of block 620. As previously mentioned, the set-up process may be performed after initial system selection or a change in the selected system.

As part of system selection, mobile device 150 may receive one or more initial messages that are broadcast by the network. For example, for CDMA networks, mobile device 150 may receive a System Parameters Message and/or an Extended System Parameters Message. These messages may include an MCC field and a SID field through which the network broadcasts a mobile country code and its system ID.

Mobile device 150 may read the value in the MCC field from the extended system parameters message (block 705). Mobile device 150 may then attempt to match the read MCC value to MCC field 410 in DLUT 400 (block 710). If the MCC value is not in DLUT 400 (block 710—NO), mobile device 150 may use the SID value obtained from the System Parameters Message to locate the corresponding entry in SID range field 420 of DLUT 400. Mobile device may then determine whether SID conflict field 430 for this entry is marked TRUE (block 715). If it is marked FALSE (block 715—NO, i.e., there is no SID conflict), mobile device 150 may look up the MCC from MCC field 410 of DLUT 400 (block 720).

If SID conflict field 430 is TRUE (block 715—YES), mobile device 150 may perform SID conflict resolution (block 730). During the SID conflict resolution process, the MCC for mobile device 150 may be determined. Resolution of a SID conflict to determine the correct SID for a network is known in the art and will not be described further herein.

For MCC value determined as a result of the performance of block 730 or block 720, or, for the MCC obtained from the Extended System Parameters Messages that matches the entry in DLUT 400 (block 710—YES), mobile device 150, if it does not support network based plus code dialing, may lookup the IDD from IDD field 460 of DLUT 400 (block 735—NO, and block 740). Additionally, in block 745, PCD value 520 may be set to FALSE, indicating that network-based plus code dialing will not be attempted during the dialing process, and IDD value 530 may be set to match the IDD value looked-up in block 740. MCC value 550 may be set to the MCC value obtained from the Extended System Parameters Message or determined in block 730 or determined in block 720.

Referring back to block 735, if the mobile device supports network-based plus code dialing (block 735—YES), mobile device 150 may perform a lookup into DLUT 400, based on the SID value broadcast by the network, and may then determine the state of the corresponding NB-PCD supported field 440 (FIG. 7B, block 750).

If the NB-PCD supported field is FALSE (block 750—NO), mobile device 150 may compare the current date to the date in NB-PCD last attempted field 750 (block 755). If difference in dates is greater than 6 months, mobile device 150 may lookup, in DLUT 400, the value for IDD field 460 (block 760—YES and block 765). The lookup may be based on a matching of the MCC value obtained from the Extended System Parameter Message (block 705) or determined in block 730 or determined in block 720. It can be appreciated that the time duration to use when comparing the current date to the last network-based plus code dialing attempt (e.g., 6 months) is exemplary. In alternative implementations, other time durations could be used. In general, the time duration to use may be chosen as one that is long enough to allow for the chance that it may be desirable to re-try network-based plus code dialing. Additionally, in block 770, PCD value 520 may be set to TRUE, indicating that network-based plus code dialing will be attempted during the dialing process; IDD value 530 may be set to match the value of the IDD looked-up in block 765, and SID value 540 may be set to the current SID. MCC value 550 may be set to the MCC value obtained from the Extended System Parameters Message or determined in block 730 or determined in block 720.

Referring back to block 760, if less than 6 months have elapsed (block 760—NO), mobile device 150 may look up, in DLUT 400, the value for IDD field 460 (block 775). This lookup may be based on a matching of the MCC value obtained from the Extended System Parameter Message (block 705) or determined in block 730 or determined in block 720. In block 780, PCD value 520 may be set to FALSE, indicating that network-based plus code dialing will not be attempted during the dialing process; IDD value 530 may be set to match the value of the IDD looked-up in block 775; and SID value 540 may be set to the current SID. MCC value 550 may be set to the MCC value obtained from the Extended System Parameters Message or determined in block 730 or determined in block 720.

Referring back to block 750, if NB-PCD supported field 440 in DLUT 400 is TRUE (block 750—YES), the mobile device 150 may lookup, in DLUT 400, the value for IDD field 460 (block 785). The lookup may be based on a matching of the MCC value obtained from the Extended System Parameter Message (block 705) or determined in block 730 or determined in block 720. In block 790, PCD value 520 may be set to TRUE, indicating that network-based plus code dialing will be attempted during the dialing process; IDD value 520 may be set to match the value of the IDD looked-up in block 785; and SID value 540 may be set to the current SID. MCC value 550 may be set to the MCC value obtained from the Extended System Parameters Message, determined in block 730 or determined in block 720. Additionally, the corresponding NB-PCD supported field 440 in DLUT 400 may be set to TRUE.

Figure 8A:
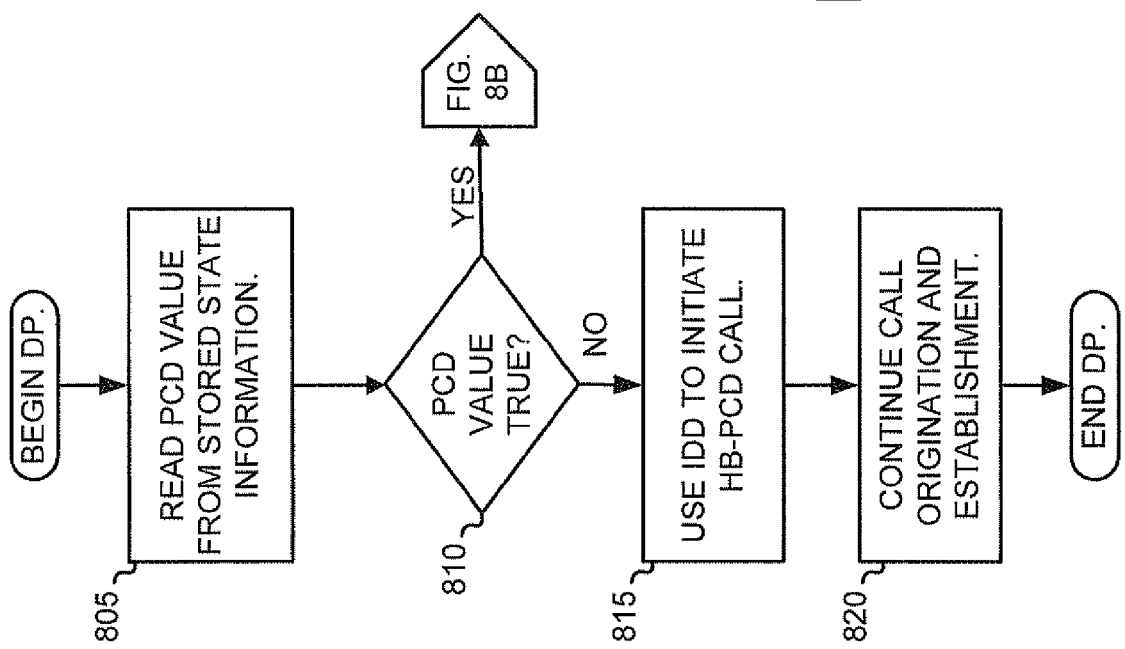

FIGS. 8A and 8B are a flow chart illustrating exemplary operations for performing the dialing process of block 640 (e.g., in response to the user entering a plus coded number). The operations of FIGS. 8A and 8B may be performed, for instance, in response to the user entering a "+" followed by the digits that are to be dialed (including the country code) or in response to the user initiating a call based on selecting an entry from a contact list, call log, or message log, where the entry begins with a "+" followed by the digits to be dialed.

To begin, mobile device 150 may read PCD value 520 from state information 500 (block 805). As previously discussed, a TRUE PCD value 520 indicates network-based plus code dialing should be used by mobile device 150. Accordingly, if PCD value 520 is TRUE, network-based plus code dialing may be attempted (block 810—YES), as shown in FIG. 8B and as will described below.

If PCD value 520 is FALSE, mobile device 150 may use IDD value 530 to initiate handset-based plus code dialing (HB-PCD) (block 815). With HB-PCD, mobile device 150 may explicitly pre-pend IDD value 530 to the country code and the national number of the called party when transmitting a message to the network initiating the call on the network. At this point, the call may be processed by the network. Mobile device 150 may continue the call in accordance with Call Origination and Call Establishment procedures (block 820). Call Origination and Call Establishment are known in the art and will not be discussed in further detail herein. The dialing process (DP) shown in FIGS. 8A and 8B may end.

Referring to FIG. 8B, network-based plus code dialing may be started (block 825). Using network-based plus code dialing to complete a call is known in the art and will not be discussed in further detail herein. In general, in network-based plus code dialing, mobile device 150 may initiate the call via a message to the network that indicates that the dialed number should be translated as an internationally formatted plus code number and the appropriate IDD should be used.

In response to the initiation of network-based plus code dialing in block 825, mobile device 150 may receive a response from the network indicating whether the network-based plus code dialing was successful (block 830). More particularly, for a CDMA2000 network, the network may return, for a successful network-based plus code dialing, a Channel Assignment message, an Extended Channel Assignment message, a Service Re-direction message, or a Retry Order. If, on the other hand, the network-based plus code dialing results in failure, the network may return, for example, an Intercept Order or a Release Order message. Alternatively, the network may return nothing over a timeout period, also indicating failure.

If the response indicates the network-based plus code dialing was a success (block 835—YES), mobile device 150 may lookup the appropriate entry in DLUT 400 based on the MCC value 550 and SID value 540 from state information 500. If NB-PCD supported field 440 is FALSE, mobile device 150 may update this field to set it to TRUE (block 840), as network-based plus code dialing is supported by the network. Mobile device 150 may lookup the correct entry in DLUT 400 based on the SID value 540.

At this point, the call may be processed by the network. Mobile device 150 may continue the call in accordance with Call Origination and Call Establishment procedures (block 845). The dialing process may accordingly end.

Referring back to block 835, network-based plus code dialing with the network may fail, (block 835—NO). In this case, mobile device 150 may use IDD value 530 to initiate handset-based plus code dialing (block 850). With HB-PCD, mobile device 150 may explicitly pre-pend IDD value 530 to the country code and the national number of the called party when initiating the call on the network. Alternatively, mobile device 150 may first re-try the network-based plus code dialing, and if the re-try fails, then use handset-based plus code dialing.

Mobile device 150 may update DLUT 400 to indicate the NB-PCD last attempted date field 450 and to update NB-PCD supported field 440 (block 855). More specifically, mobile device 150 may lookup the appropriate entry in DLUT 400, and if NB-PCD supported field 440 is FALSE, mobile device 150 may update NB-PCD last attempted field 450 to the current date (e.g., current month and year). If, however, the NB-PCD supported field 440 is TRUE, mobile device may update this field to FALSE and update NB-PCD last attempted field 450 to the current date. Mobile device 150 may lookup the correct entry in DLUT 400 based on the SID range value 540 and MCC value 550.

Mobile device 150 may continue the call in accordance with Call Origination and Call Establishment procedures (block 860). The dialing process shown in FIGS. 8A and 8B may end.

As described above, a mobile device may execute a set-up process and a dialing process through which the mobile device may use plus code dialing for international numbers irrespective of whether the network inherently supports plus code dialing.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks and/or acts have been described with regard to the processes illustrated in FIGS. 6-8, the order of the acts and/or blocks may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed:

1. A method implemented by a mobile device, the method comprising:
    connecting to a wireless network in range of the mobile device;
    performing, in response to the connection to the wireless network, a set-up process to obtain state information describing whether the network supports network-based plus code dialing, where the set-up process includes:
        calculating a time difference between a current date and a last date a network-based plus code dialing was attempted,
        setting the state information to indicate the network supports network-based plus code dialing when the time difference indicates greater than a certain amount of time has passed since the last network-based plus code dialing attempt, and
        setting the state information to store a current International Direct Dial (IDD) prefix, system ID (SID) and mobile country code (MCC) values;
    receiving a request from a user of the mobile device to place an international call to a specified destination;
    transmitting, in response to the request from the user and when the state information indicates the network supports network-based plus code dialing, a message to the network to initiate the international call based on a network-based plus code dialing scheme; and
    transmitting, in response to the request from the user and when the state information indicates the network does not support network-based plus code dialing, a message to the network to initiate the international call using a handset-based plus code dialing scheme.

2. The method of claim 1, where the connecting to the wireless network in range of the mobile device includes connecting to the wireless network when the mobile device is initially turned-on or in response to a change in reception quality of the wireless network by the mobile device.

3. A method implemented by a mobile device, the method comprising:
    connecting to a wireless network in range of the mobile device;
    performing, in response to the connection to the wireless network, a set-up process to obtain state information describing whether the network supports network-based plus code dialing, where the set-up process includes accessing a table stored in non-volatile memory, the table including one or more entries that each include:
        a mobile country code (MCC) field;
        a system ID (SID) field;
        a field indicating whether network-based plus code dialing is supported; and
        an International Direct Dial (IDD) prefix field;
    receiving a request from a user of the mobile device to place an international call to a specified destination;
    transmitting, in response to the request from the user and when the state information indicates the network supports network-based plus code dialing, a message to the network to initiate the international call based on a network-based plus code dialing scheme; and
    transmitting, in response to the request from the user and when the state information indicates the network does not support network-based plus code dialing, a message to the network to initiate the international call using a handset-based plus code dialing scheme.

4. The method of claim 3, where each entry further includes:
 a field indicating whether there is a SID conflict; and
 a field indicating when network-based plus code dialing was last attempted.

5. The method of claim 1, where the set-up process includes:
 receiving a mobile country code (MCC) in an System Parameters Message; and
 receiving a system ID (SID) in the System Parameters Message.

6. The method of claim 1, where the obtained state information is obtained based on access of a table stored in non-volatile memory.

7. A method implemented by a mobile device, the method comprising:
 connecting to a wireless network in range of the mobile device;
 performing, in response to the connection to the wireless network, a set-up process to obtain state information describing whether the network supports network-based plus code dialing, where the obtained state information is obtained based on access of a table stored in non-volatile memory;
 receiving a request from a user of the mobile device to place an international call to a specified destination;
 transmitting, in response to the request from the user and when the state information indicates the network supports network-based plus code dialing, a message to the network to initiate the international call based on a network-based plus code dialing scheme;
 transmitting, in response to the request from the user and when the state information indicates the network does not support network-based plus code dialing, a message to the network to initiate the international call using a handset-based plus code dialing scheme; and
 in response to transmitting the message to the network to initiate the international call based on the network-based plus code dialing scheme:
  receiving a result of the network-based plus code dialing; and
  updating the table based on the result to indicate whether the network-based plus code dialing was successful or unsuccessful.

8. The method of claim 7, further comprising, when the result indicates that network-based plus code dialing is not successful: transmitting a second message to the network to initiate the international call based on the handset-based plus code dialing scheme.

9. The method of claim 1, where the handset-based plus code dialing scheme includes:
 receiving an International Direct Dial (IDD) prefix from the state information; and
 pre-pending the IDD to a telephone number received as part of the request from the user.

10. A device comprising:
 a wireless communication interface to connect to a wireless network in range of the device;
 a memory to store state information indicating whether the wireless network supports network-based plus code dialing; and
 a processing system to, in response to a request from a user of the device to place an international call to a specified destination:
  transmit, via the wireless communication interface and when the state information indicates that the wireless network supports network-based plus code dialing, a first message to the wireless network to initiate the international call, the first message initiating the international call using a network-based plus code dialing scheme, and
  transmit, via the wireless communication interface and when the state information indicates the wireless network does not support network-based plus code dialing, a second message to the network to initiate the international call, the second message initiating the international call using a handset-based plus code dialing scheme,
 where the memory includes non-volatile memory, and
 where a table is stored in the non-volatile memory, the table including one or more entries that each include:
  a mobile country code (MCC) field;
  a system ID (SID) field;
  a field indicating whether network-based plus code dialing is supported; and
  an International Direct Dial (IDD) prefix field.

11. The device of claim 10, where each entry of the table further includes:
 a field indicating whether there is a SID conflict; and
 a field indicating when network-based plus code dialing was last attempted.

12. The device of claim 10, where the state information is obtained based on access of the table stored in non-volatile memory.

13. A device comprising:
 a wireless communication interface to connect to a wireless network in range of the device;
 a memory to store state information indicating whether the wireless network supports network-based plus code dialing; and
 a processing system to, in response to a request from a user of the device to place an international call to a specified destination:
  transmit, via the wireless communication interface and when the state information indicates that the wireless network supports network-based plus code dialing, a first message to the wireless network to initiate the international call, the first message initiating the international call using a network-based plus code dialing scheme, and
  transmit, via the wireless communication interface and when the state information indicates the wireless network does not support network-based plus code dialing, a second message to the network to initiate the international call, the second message initiating the international call using a handset-based plus code dialing scheme,
 where the processing system additionally includes instructions to:
  calculate a time difference between a current date and a last date at which the message was transmitted; and
  set the state information to indicate the network supports network-based plus code dialing when the time difference indicates greater than a certain amount of time has passed.

14. A device comprising:
 a wireless communication interface to connect to a wireless network in range of the device;
 a memory to store state information indicating whether the wireless network supports network-based plus code dialing; and a processing system to, in response to a request from a user of the device to place an international call to a specified destination:
  transmit, via the wireless communication interface and when the state information indicates that the wireless network supports network-based plus code dialing, a first message to the wireless network to initiate the international call, the first message initiating the international call using a network-based plus code dialing scheme, and
  transmit, via the wireless communication interface and when the state information indicates the wireless network does not support network-based plus code dialing, a second message to the network to initiate the international call, the second message initiating the international call using a handset-based plus code dialing scheme,
where the processing system additionally includes instructions to:
  receive a result of the network-based plus code dialing; and
  update, based on the received result, a table stored in the memory to indicate whether the network-based plus code dialing was successful or unsuccessful.

15. The device of claim 14, where the processing system additionally includes instructions to, when the result indicates that network-based plus code dialing is not successful:
  transmit a third message to the network to initiate the international call based on the handset-based plus code dialing scheme.

16. A mobile device comprising:
  means for connecting to a wireless network in range of the mobile device;
  means for performing, in response to the connection to the wireless network, a set-up process to obtain state information describing whether the network supports network-based plus code dialing;
  means for storing the state information in one or more entries that each include:
    a mobile country code (MCC) field;
    a system ID (SID) field;
    a field indicating whether network-based plus code dialing is supported; and
    an International Direct Dial (IDD) prefix field;
  means for receiving a request from a user of the mobile device to place an international call to a specified destination;
  means for transmitting, in response to the request from the user and when the state information indicates the network supports network-based plus code dialing, a message to the network to initiate the international call based on a network-based plus code dialing scheme; and
  means for transmitting, in response to the request from the user and when the state information indicates the network does not support network-based plus code dialing, a message to the network to initiate the international call using a handset-based plus code dialing scheme.

17. The mobile device of claim 16, where each of the one or more entries further includes at least one of:
  a field indicating whether there is a SID conflict; or
  a field indicating when network-based plus code dialing was last attempted.

18. The mobile device of claim 16, where the wireless network is a first wireless network, and
where the means for connecting to the wireless network include:
  means for handing over the mobile device from a second wireless network to the first wireless network.

19. The mobile device of claim 16, further comprising:
  means for receiving, when the message is transmitted to the network to initiate the international call based on the network-based plus code dialing scheme, a result of the network-based plus code dialing; and
  means for updating the storing means based on the result to indicate whether the network-based plus code dialing was successful or unsuccessful.

20. The mobile device of claim 19, further comprising,
  means for transmitting, when the result indicates that network-based plus code dialing is not successful, a second message to the network to initiate the international call based on the handset-based plus code dialing scheme.

* * * * *